US007946327B2

(12) United States Patent
Fox et al.

(10) Patent No.: US 7,946,327 B2
(45) Date of Patent: May 24, 2011

(54) KNIFE BLADE GUARD LOCKING MECHANISM FOR USE IN CONJUNCTION WITH THE SEALING TAPE APPLICATION ROLLERS OF A TAPE ROLL DISPENSING CARTRIDGE ASSEMBLY OF A CASE SEALING MACHINE

(75) Inventors: Bryce J. Fox, Honesdale, PA (US); William J. Menta, West Wyoming, PA (US)

(73) Assignee: Illinois Tool Works Inc., Glenview, IL (US)

(*) Notice: Subject to any disclaimer, the term of this patent is extended or adjusted under 35 U.S.C. 154(b) by 462 days.

(21) Appl. No.: 12/073,144

(22) Filed: Feb. 29, 2008

(65) Prior Publication Data

US 2009/0217622 A1 Sep. 3, 2009

(51) Int. Cl.
*B65B 51/06* (2006.01)
*B29C 63/04* (2006.01)

(52) U.S. Cl. ........ 156/486; 156/475; 156/478; 156/479; 156/480; 156/487; 156/488; 156/489; 156/493; 156/510; 156/516

(58) Field of Classification Search .................. 156/250, 156/252, 256, 475, 478–480, 486–489, 493, 156/516, 517, 510
See application file for complete search history.

(56) References Cited

U.S. PATENT DOCUMENTS 4,061,526 A * 12/1977 Warshaw et al. ............. 53/136.4
4,762,586 A * 8/1988 Wilkie .......................... 156/527
5,228,943 A * 7/1993 Vasilakes ...................... 156/468

* cited by examiner

*Primary Examiner* — Mark A Osele
*Assistant Examiner* — Christopher C Caillouet
(74) *Attorney, Agent, or Firm* — Lawoffices of Steven W. Weinrieb

(57) ABSTRACT

A knife blade guard locking mechanism, for use in conjunction with the sealing tape application rollers of a tape cartridge assembly of a case sealing machine, is adapted to be operatively connected to a spring biasing mechanism of the sealing tape application rollers such that when the sealing tape application rollers are disposed at their inoperative positions, the knife blade guard locking mechanism is disposed at its locked position so as to effectively cover the knife blade in order to protect personnel from being accidentally cut. Conversely, when the sealing tape application rollers are disposed at their operative positions, the knife blade guard locking mechanism is automatically unlocked so as to permit the knife blade to be uncovered in order to perform its sealing tape cutting operation.

13 Claims, 1 Drawing Sheet

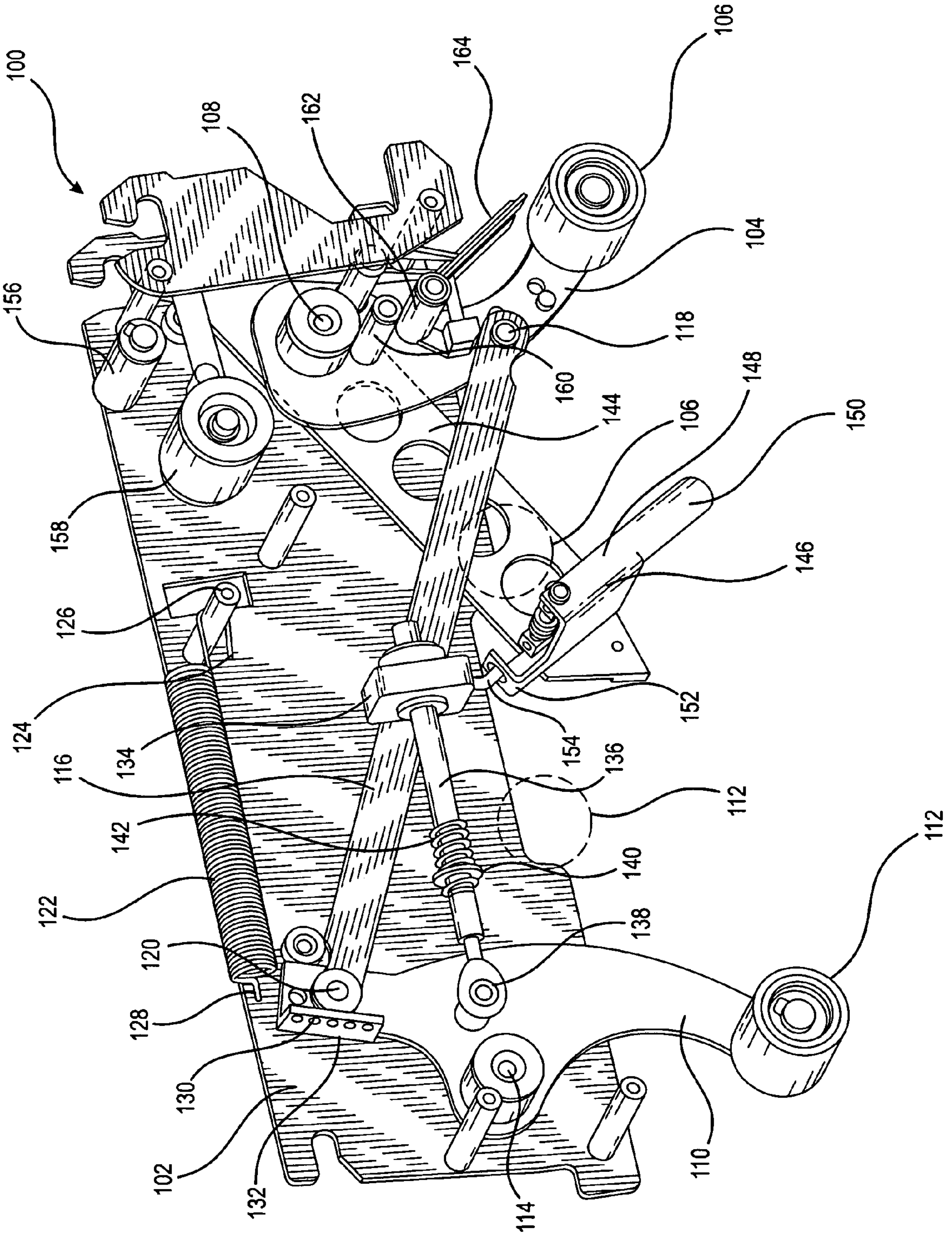
100
106
164
162
108
104
156
118
160
148
144
106
150
158
146
126
152
124
154
134
136
116
112
142
112
140
122
138
120
128
130
102
132
114
110

KNIFE BLADE GUARD LOCKING MECHANISM FOR USE IN CONJUNCTION WITH THE SEALING TAPE APPLICATION ROLLERS OF A TAPE ROLL DISPENSING CARTRIDGE ASSEMBLY OF A CASE SEALING MACHINE

FIELD OF THE INVENTION

The present invention relates generally to carton or case sealing machines, and more particularly to a new and improved knife blade guard or cover locking mechanism for use in conjunction with the sealing tape application rollers of a tape cartridge assembly of a carton or case sealing machine wherein the knife blade guard or cover locking mechanism is adapted to be operatively connected to a spring biasing mechanism of the sealing tape application rollers such that when the sealing tape application rollers are effectively disposed at their inoperative positions, such as, for example, when the tape cartridge assembly is being loaded into or unloaded from the carton or case sealing machine, or when a sealing tape roll is being replaced or exchanged, the knife blade guard or cover locking mechanism is disposed at its locked position so as to effectively cover or enclose the knife blade or cutting member in order to protect operator or maintenance personnel from being accidentally or inadvertently cut. Conversely, when the sealing tape application rollers are effectively disposed at their operative positions, such as, for example, during a carton or case sealing operation, the knife blade guard or cover locking mechanism is effectively unlocked so as to permit the knife blade or cutting member to be uncovered or exposed and thereby perform its sealing tape cutting or severing operation.

BACKGROUND OF THE INVENTION

In connection with the operation of carton or case sealing machines, a knife blade guard or cover is usually operatively associated with the knife blade or cutting member which is normally utilized to cut or sever a trailing end portion of the carton or case sealing tape in order to form a rear end tab portion of the sealing tape which is adapted to, for example, be applied to the vertically oriented rear surface portion of the carton or case being sealed. Conventionally, such knife blade guards or covers are simply movable from first positions, at which the knife blade guards or covers enclose or cover the knife blades or cutting members, to second positions at which the knife blade guards or covers uncover or expose the knife blades or cutting members. Unfortunately, such conventional knife blade guards or covers are often accidentally or inadvertently moved to their open or uncovered positions whereby the knife blades or cutting members are exposed thereby leading to the accidental or unintentional cutting of operator or maintenance personnel.

A need therefore exists in the art for a new and improved knife blade guard or cover locking mechanism wherein the knife blade guard or cover will be locked at its covered or enclosed position with respect to the knife blade or cutting member, and cannot be simply moved from its covered or enclosed position with respect to the knife blade or cutting member when a carton or case sealing operation is not being performed, and yet the knife blade guard or cover will be automatically unlocked so as to permit the same to be moved to an uncovered position so as to effectively expose the knife blade or cutting member in order to permit the knife blade or cutting member to perform its sealing tape cutting or severing operation during a carton or case sealing operation.

SUMMARY OF THE INVENTION

The foregoing and other objectives are achieved in accordance with the teachings and principles of the present invention through the provision of a new and improved knife blade guard or cover locking mechanism for use in conjunction with the sealing tape application rollers of a tape cartridge assembly of a carton or case sealing machine wherein the knife blade guard or cover locking mechanism is adapted to be operatively connected to a spring biasing mechanism of the sealing tape application rollers such that when the sealing tape application rollers are effectively disposed at their inoperative positions, such as, for example, when the tape cartridge assembly is being loaded into or unloaded from the carton or case sealing machine, or when a sealing tape roll is being replaced or exchanged, the knife blade guard or cover locking mechanism is disposed at its locked position so as to effectively cover or enclose the knife blade or cutting member in order to protect operator or maintenance personnel from being accidentally or inadvertently cut. Conversely, when the sealing tape application rollers are effectively disposed at their operative positions, such as, for example, during a carton or case sealing operation, the knife blade guard or cover locking mechanism is effectively automatically unlocked so as to permit the knife blade or cutting member to in fact be uncovered or exposed and thereby perform its sealing tape cutting or severing operation.

BRIEF DESCRIPTION OF THE DRAWING

Various other features and attendant advantages of the present invention will be more fully appreciated from the following detailed description when considered in connection with the accompanying drawings in which like reference characters designate like or corresponding parts throughout the several views, and wherein:

The SOLE FIGURE is a perspective view of a new and improved knife blade guard or cover locking system or mechanism, operatively associated with or connected to the front and rear application roller arms and the sealing tape application rollers mounted thereon, which is disposed at its locked state when the front and rear application roller arms, and the sealing tape application rollers mounted thereon, are effectively disposed at their inoperative positions during which a carton or case sealing operation is not being performed, and which is automatically disposed at its unlocked state when the front and rear application roller arms, and the sealing tape application rollers mounted thereon, are effectively disposed at their operative positions during which a carton or case sealing operation is being performed.

DETAILED DESCRIPTION OF THE PREFERRED EMBODIMENT

Referring now to the drawings, and more particularly to the SOLE FIGURE thereof, a new and improved knife blade guard or cover locking mechanism or system, for use in conjunction with the front and rear application roller arms, and the sealing tape application rollers mounted thereon, so as to cover or enclose, or to uncover or expose, the knife blade or cutting member of a tape cartridge assembly of a carton or case sealing machine, wherein the knife blade guard or cover locking mechanism or system has been constructed in accordance with the principles and teachings of the present invention, is disclosed and is generally indicated by the reference character 100. More particularly, it is seen that the new and improved knife blade guard or cover locking mechanism or system 100 comprises a main mounting plate 102 upon which a first front application roller arm 104 is mounted. A front carton or case sealing tape application roller 106 is mounted upon the lower end portion of the first front application roller arm 104 for applying a leading end portion of a carton or case sealing tape to the vertically oriented front surface portion of the carton or case, and it is seen that the first front application roller arm 104 is pivotally mounted upon the main mounting plate 102 by means of a first pivot pin assembly 108. In addition, a second rear application roller arm 110, upon the lower end portion of which is mounted a rear carton or case sealing tape application roller 112 for applying a trailing end portion of the carton or case sealing tape to the vertically oriented rear surface portion of the carton or case, is pivotally mounted upon the main mounting plate 102 by means of a second pivot pin assembly 114.

A link bar 116 has a first end portion thereof pivotally connected to a central portion of the first front application roller arm 104 as at 118, while a second opposite end portion of the link bar 116 is pivotally connected to an upper end portion of the second rear application roller arm 110 as at 120 such that the link bar 116 operatively interconnects the first front and second rear application roller arms 104, 110 together. Accordingly, it can be appreciated that when, for example, the front carton or case sealing tape application roller 106, mounted upon the first front application roller arm 104, encounters the vertically oriented front surface portion of the carton or case to be sealed with the sealing tape, the front carton or case sealing tape application roller 106 will initially be effectively pushed, by means of the vertically oriented front surface portion of the carton or case, toward the left, as viewed within the SOLE FIGURE, such that as a result of the pivotal movement of the first front application roller arm 104, in the clockwise direction, around its pivot axis as defined by means of its pivot pin assembly 108, the front carton or case sealing tape application roller 106 will effectively be moved along an arcuate path from its original or start position, as illustrated in solid lines within the SOLE FIGURE, to an end of movement position, as is illustrated in dotted lines within the SOLE FIGURE. Simultaneously therewith, it can be readily appreciated that, as a result of the aforenoted operative interconnection defined between the first front application roller arm 104 and the second rear application roller arm 110 by means of the link bar 116, the second rear application roller arm 110 will be pivotally moved in a counterclockwise direction around its pivot axis, as defined by means of its pivot pin assembly 114, such that the upper end portion of the second rear application roller arm 110 will be moved toward the left as viewed within the SOLE FIGURE while the lower end portion of the second rear application roller arm 110, upon which is mounted the rear carton or case sealing tape application roller 112, such that the rear carton or case sealing tape application roller 112 will effectively be moved along an arcuate path from its original or start position, as illustrated in solid lines within the SOLE FIGURE, to an end of movement position, as is illustrated in dotted lines within the SOLE FIGURE.

It is also seen that a first spring-biasing means, in the form of a coil spring 122, has a first end portion 124 engaged with a mounting pin 126 which is fixedly mounted upon the main mounting plate 102, while a second opposite end portion 128 of the first spring-biasing means 122 is adapted to be engaged within any one of, for example, five apertures 130 defined within a bracket 132 which is integrally mounted upon the second rear application roller arm 110. In this manner, when the first front application roller arm 104 and the second rear application roller arm 110 are pivotally moved from their original positions, at which the front carton or case sealing tape application roller 106 and the rear carton or case sealing tape application roller 112 are respectively illustrated by means of solid lines within the SOLE FIGURE, to their end of movement positions at which the front carton or case sealing tape application roller 106 and the rear carton or case sealing tape application roller 112 are respectively illustrated by means of dotted lines within the SOLE FIGURE, the first spring biasing means 122 will be expanded whereby the same will cause the first front application roller arm 104 and the second rear application roller arm 110, upon which the front carton or case sealing tape application roller 106 and the rear carton or case sealing tape application roller 112 are respectively mounted, to be returned to their original or start positions, as illustrated by means of the solid lines within the SOLE FIGURE, when the first spring biasing means 122 is permitted to contract back to its original state, as illustrated within the SOLE FIGURE, at a predetermined point of time of the tape sealing operational cycle as will be explained more fully hereinafter. It is lastly noted in connection with the first spring biasing means 122, and the connection of its second end portion 128 to the bracket 132 mounted upon the second rear application roller arm 110, that the provision of, for example, the five different apertures 130 defined within the bracket 132 permits the actual tension of the first spring-biasing means 122 to be operatively adjusted as desired.

Continuing further, in accordance with additional principles and teachings of the present invention, it is seen that a slide block 134 is movably mounted upon a guide rod 136, and that the left end portion of the guide rod 136 is pivotally connected to a substantially central portion of the second rear application roller arm 110 by means of a pivot pin assembly 138. The slide block 134 is pivotally connected to the link bar 116 by means of a pivot pin, not visible, which projects outwardly from, in effect, the back side of the slide block 134 so as to be disposed within an aperture, also not visible, which is defined within the link bar 116. In this manner, the slide block 134 is movable, along with the link bar 116, from its original or start position, as illustrated within the SOLE FIGURE, to an end of movement position when the link bar 116 is itself moved from its original or start position as illustrated within the SOLE FIGURE to its end of movement position which correlates with the angular or pivotal movements of the first front application roller arm 104 and the second rear application roller arm 110 having the front carton or case sealing tape application roller 106 and the rear carton or case sealing tape application roller 112 respectively mounted thereon, as has been previously described. Still yet further, it is also seen that a stop member 140, in the form of, for example, a washer, is fixedly secured at a predetermined location upon the guide rod 136, and a second spring biasing means 142, in the form of a coil spring, is fixedly disposed upon the guide rod 136 as a result of effectively having several coils thereof being operatively engaged with the stop member or washer 140.

Accordingly, when the slide block 134 is moved toward the left, as viewed within the SOLE FIGURE, from its original or start position to its end of movement position adjacent to the stop member or washer 140, the second spring biasing means 142 will be compressed so as to exert an increased or enhanced amount of biasing force, pressure, or tension upon the second rear application roller arm 110 for an operational purpose that will be explained more fully hereinafter. It is lastly noted that a knife support arm 144, as more fully described within copending patent application entitled QUICK CHANGE KNIFE BLADE ASSEMBLY FOR A TAPE ROLL DISPENSING CARTRIDGE ASSEMBLY OF A CASE SEALING MACHINE, is also pivotally mounted upon the main mounting plate 102, wherein the knife support arm 144 is adapted to have a downwardly extending or dependent knife blade or cutting member 146 fixedly mounted thereon, the knife support arm 144 being biased in a downward mode by a spring-biasing means, not shown, such that the knife support arm 144 is normally disposed at its lowered position as illustrated within the SOLE FIGURE.

A knife blade guard or cover 148 is pivotally mounted upon the knife support arm 144 so as to be movable between a first position at which the knife blade guard or cover 148 covers the knife blade or cutting member 146 so as to protect operator or maintenance personnel, and a second position at which the knife blade guard or cover 148 effectively uncovers the knife blade or cutting member 146 so as to permit the knife blade or cutting member 146 to cut the sealing tape in order to, for example, effectively define a rear tab or trailing end portion of the sealing tape which is adapted to be applied, by means of a wiping operation, onto the vertically oriented rear surface portion of the carton or case by means of the rear carton or case sealing tape application roller 112. The knife blade guard or cover 148 is normally biased to its first position covering the knife blade or cutting member 146 by means of a torsion spring, not illustrated for clarity purposes, as is disclosed within copending patent application QUICK CHANGE KNIFE BLADE ASSEMBLY FOR A TAPE ROLL DISPENSING CARTRIDGE ASSEMBLY OF A CASE SEALING MACHINE.

The knife blade guard or cover 148 is provided with a dependent tab member 150 which is adapted to be engaged by the carton or case to be sealed, as the carton or case is being moved along its tape sealing path, so as to effectively move the knife guard or cover 148 from its first position, at which the knife blade guard or cover 148 covers the knife blade or cutting member 146, to its second position at which the knife blade guard or cover 148 effectively uncovers the knife blade or cutting member 146. In accordance with the principles and teachings of the present invention, it is also noted that the knife blade guard or cover 148 is provided with an upstanding bracket member 152 within which there is defined an aperture, not clearly visible within the SOLE FIGURE. Correspondingly, the slide block 134 is provided with a dependent lug member 154 which is adapted to be engaged within the aperture, not visible, which is defined within the upstanding bracket member 152 when the slide block 134 is disposed at its original or start position as illustrated within the SOLE FIGURE. In this manner, the knife blade guard or cover 148 is effectively prevented from being moved from its covering or enclosing position, with respect to the knife blade or cutting member 146, to its uncovering or exposing position with respect to the knife blade or cutting member 146 when the slide block 134 is disposed at its illustrated position within the SOLE FIGURE which corresponds to the inoperative positions of the first and second front and rear application roller arms 104,110 and the front and rear carton or case sealing tape application rollers 106, 112. Alternatively, when the slide block 134 is moved toward the left from its original or start position to its end of movement position, as viewed within the SOLE FIGURE, such as, for example, when the link bar 116 is moved from its original or start position, as illustrated within the SOLE FIGURE, to its end of movement position in correlation with the angular or pivotal movements of the first front application roller arm 104 and the second rear application roller arm 110, having the front carton or case sealing tape application roller 106 and the rear carton or case sealing tape application roller 112 respectively mounted thereon, as has been previously described, and during, for example, a carton or case sealing operation, the lug member 154 will be disengaged from the aperture, not visible, defined within the upstanding backet member 152 of the knife blade guard or cover 148 so that the knife blade or guard or cover 148 will be automatically released or unlocked. In this manner, the knife blade guard or cover 148 will be permitted to be moved to its uncovered position with respect to the knife blade or cutting member 146 so as to, in turn, permit the knife blade or cutting member 146 to be exposed and thereby perform its sealing tape cutting function at the predetermined point in time of the carton or case sealing operation.

Having described substantially all of the structural components comprising the new and improved spring tension control system 100 of the present invention, a brief operational cycle of the various component parts as previously described, including the new and improved knife blade guard or cover locking mechanism or system 100 of the present invention, will now be described. More particularly, it is firstly noted that a leading end tab portion of the carton or case sealing tape is adapted to be routed, for example, from a tape supply roll, not shown, around a right external peripheral side surface portion of a first idler roller 156, beneath a lower external peripheral surface portion of the first idler roller 156, over an upper external peripheral surface portion of a second idler roller 158, and around a left external peripheral side surface portion of the second idler roller 158. From the second idler roller 158, the leading end tab portion of the carton or case sealing tape is conducted between third and fourth idler rollers 160,162 so as to effectively be conducted onto a guide plate 164 such that the free end portion of the leading end tab portion of the carton or case sealing tape will be disposed upon or alongside the right external peripheral side surface portion of the front carton or case sealing tape application roller 106. In this manner, the leading end tab portion of the carton or case sealing tape will effectively be interposed or sandwiched between the right external peripheral side surface portion of the front carton or case sealing tape application roller 106 and the vertically oriented front surface portion of the carton or case, when the vertically oriented front surface portion of the carton or case engages the front carton or case sealing tape application roller 106.

Subsequently, as the carton or case is then conveyed in the conveyance direction, which extends from right to left as viewed within the SOLE FIGURE, the front carton or case sealing tape application roller 106 will, in effect, be forced toward the left, as viewed within the SOLE FIGURE, and will also begin to move upwardly along the vertically oriented front surface portion of the carton or case, as the conveyed carton or case effectively pushes the front carton or case sealing tape application roller 106 out of its way whereby the front carton or case sealing tape application roller 106 will effectively apply the leading end tab portion of the carton or case sealing tape onto the vertically oriented front surface portion of the carton or case by means of a wiping action. As a result of the aforenoted movement of the front carton or case sealing tape application roller 106, the first front application roller arm 104 will be forced to rotate in the clockwise direction around its pivot pin assembly 108 thereby causing the link bar 116 to effectively be moved toward the left and to be simultaneously rotated a predetermined amount, in the counterclockwise direction, around a pivot axis effectively defined by means of its connection to the slide block 134 and as respectively permitted by means of the pivotal connections

118,120 defined between the opposite ends of the link bar 116 and the first and second front and rear application roller arms 104,110.

In addition, since the second rear application roller arm 110 is operatively connected to the first front application roller arm 104 by means of the link bar 116, the second rear application roller arm 110 will be pivoted or rotated in the counterclockwise direction around its pivot pin assembly 114 whereby the second carton or case sealing tape application roller 112 will begin to move upwardly and toward the first carton or case sealing tape application roller 106 until both of the front and rear carton or case sealing tape application rollers 106, 112 ultimately reach their end of movement positions, as illustrated by means of the dotted lines within the SOLE FIGURE, at which point in time the front carton or case sealing tape application roller 106 will be disposed upon the horizontally oriented upper surface portion of the carton or case while the second carton or case sealing tape application roller 112 will be disposed at a position which is spaced just above the upper surface portion of the carton or case. As a result of such movements, the front carton or case sealing tape application roller 106 will be able to wipe the carton or case sealing tape along the upper surface portion of the carton or case in the direction extending from the vertically oriented front surface portion of the carton or case toward the vertically oriented rear surface portion of the carton or case as the carton or case is being continuously conveyed along its conveyance path which is now, in effect, disposed beneath the front and rear carton or case sealing tape application rollers 106,112.

It is also to be noted at this point in time that in view of the substantially leftward movement of the link bar 116, and its operative connection to the slide block 134, the slide block 134 will be moved along the guide rod 136 such that the dependent lug member 154 of the slide block 134 will be disengaged from the aperture formed within the bracket member 152 of the knife blade guard or cover 148 so as to effectively automatically release or unlock the knife blade guard or cover 148 with respect to the knife blade or cutting member 146. In this manner, as the carton or case is being conveyed along its conveyance path, the upper portion of the vertically oriented front surface portion of the carton or case will encounter the tab member 150 of the knife blade guard or cover 148 so as to effectively pivot the same to its uncovered position thereby uncovering or exposing the knife blade or cutting member 146. In addition, the vertically oriented front surface portion of the carton or case will also encounter the knife support arm 144 so as to effectively move the same, along with the knife blade or cutting member 146 and the knife blade guard or cover 148 mounted thereon, to an elevated position, against its spring-biasing means, for a purpose to be explained hereinafter and which is also described within the aforenoted copending patent application entitled QUICK CHANGE KNIFE BLADE ASSEMBLY FOR A TAPE ROLL DISPENSING CARTRIDGE ASSEMBLY OF A CASE SEALING MACHINE.

Subsequently, as the front carton or case sealing tape application roller 106 approaches the upper rear edge portion of the carton or case, and in view of the fact that the front carton or case sealing tape application roller 106 is disposed at its dotted line position as illustrated within the SOLE FIGURE, whereby the front carton or case sealing tape application roller 106 is seen to be disposed immediately adjacent to the uncovered or exposed knife blade or cutting member 146, the front carton or case sealing tape application roller 106 will, in effect, fall off or be disengaged from the upper surface portion of the carton or case, and immediately thereafter, the knife support arm 144 will likewise, in effect, fall off or be disengaged from the upper surface portion of the carton or case. In view of the aforenoted spring-biasing of the knife support arm 144, the knife support arm 144 will now be biased back toward its original lowered position as illustrated within the SOLE FIGURE, whereby the knife blade or cutting member 146 can cut or sever the carton or case sealing tape thereby forming a rear tab portion of the carton or case sealing tape which is to be applied along the vertically oriented rear surface portion of the carton or case by means of a wiping action performed by means of the rear carton or case sealing tape application roller 112.

It is to be noted that since both the front carton or case sealing tape application roller 106 and the knife support arm 144 are no longer engaged with or disposed upon the upper surface portion of the carton or case being sealed, the rear carton or case sealing tape application roller 112 is able to, in effect, be lowered into engagement with the upper surface portion of the carton or case being sealed so as to in fact perform its sealing function with respect to rear tab portion of the carton or case sealing tape along the vertically oriented rear surface portion of the carton or case. It is also to be noted that since the rear carton or case sealing tape application roller 112 is at this point in time disposed at its dotted line position, as illustrated within the SOLE FIGURE, whereby the rear carton or case sealing tape application roller 112 will also be disposed immediately adjacent to the left end portion of the knife support arm 144 and the knife blade or cutting member 146, then when the knife support arm 144 and the knife blade or cutting member 146 move to their lowered positions at which the knife blade or cutting member 146 cuts or severs the sealing tape in order to form the aforenoted rear tab portion of the sealing tape, the rear carton or case sealing tape application roller 112 will be substantially disposed at the upper rear edge or corner region of the carton or case. Still further, in view of the aforenoted disengagement of the front carton or case sealing tape application roller 106 from the upper surface portion of the carton or case, and the commencement of the downward movement thereof through, in effect, its return stroke or movement between its dotted line position and its solid line position, the second spring biasing means 142, which is disposed upon the guide rod 136 and which was previously compressed by means of the slide block 134 when the slide block 134 was moved from its rightwardmost position, illustrated within the SOLE FIGURE, to its leftwardmost position adjacent to the stop member 140, will now tend to expand back toward its normally non-compressed state.

It is interesting to note, however, that the expansion of the second spring-biasing means 142 back toward its normally non-compressed state does not directly cause the second rear application roller arm 110 to move with an increased or enhanced amount of speed in the clockwise direction so as to, in turn, cause the rear carton or case sealing tape application roller 112 to rapidly move toward the left and back to its original position, as illustrated in solid lines as viewed within the SOLE FIGURE, so as to rapidly engage and apply the rear tab portion of the sealing tape onto the vertically oriented rear surface portion of the carton or case by means of the aforenoted wiping action. In fact, such rapid clockwise movement of the second rear application roller arm 110, and the consequent rapid leftward movement of the rear carton or case sealing tape application roller 112, is accomplished, in effect, indirectly as a result of the expansion of the second spring-biasing means 142. More particularly, when the rear carton or case sealing tape application roller 112 is disposed at its dotted line position as illustrated within the SOLE FIGURE, the pivot pin assembly 138, operatively connecting the left end portion of the guide rod 136 to the second rear application roller arm 110, will, in effect, be disposed above the pivot pin assembly 114, by means of which the second rear application roller arm 110 is pivotally mounted upon the main mounting plate 102, as a result of the angular movement of the second rear application roller arm 110 around its pivot pin assembly 114 as the rear carton or case sealing tape application roller 112 is moved from its original solid line position as illustrated within the SOLE FIGURE to its dotted line position as illustrated within the SOLE FIGURE. Accordingly, when the second spring biasing means 142 undergoes its expansion, if the expansion force of the same was directed toward the left so as to be imparted directly toward the second rear application roller arm 110, as viewed in the SOLE FIGURE, it would be oriented along a direction which would not in fact tend to move the second rear application roller arm 110 in the clockwise direction so as to in fact return the second rear application roller arm 110, and the rear carton or case sealing tape application roller 112 to its original solid line position.

In fact, therefore, the expansion force of the second spring biasing means 142 operates or acts, in effect, in conjunction with the contraction forces of the first spring biasing means 122, which was previously expanded when the front and rear carton or case sealing tape application rollers 106,112 were moved from their solid line positions to their dotted line positions as illustrated within the SOLE FIGURE, so as to be quickly imparted to and impressed upon the slide block 134 in order to quickly move the same along the guide rod 136 back toward its original position, as illustrated within the SOLE FIGURE. In this manner, the link bar 116 will be rapidly returned to its original position, as illustrated within the SOLE FIGURE, under the influence of both the contraction force of the first spring-biasing means 122 and the expansion force of the second spring-biasing means 142.

More particularly, the left end portion of the link bar 116, which is pivotally connected to the upper end portion of the second rear application roller arm 110, will, in effect, act upon the upper end portion of the second rear application roller arm 110 so as to cause the same to be rapidly rotated in the clockwise direction so as to in fact rapidly move the rear carton or case sealing tape application roller 112 in the leftward direction, back toward its original position as illustrated within the SOLE FIGURE, for its rapid engagement with the rear tab portion of the sealing tape in order to quickly and properly apply the same onto the vertically oriented rear surface portion of the carton or case being sealed. In addition, when the first and second front and rear application roller arms 104,110, and the front and rear carton or case sealing tape application rollers 106, 112 mounted thereon, as well as the slide block 134, have all been returned to their original or start positions, the lug member 154 of the slide block 134 will again be automatically disposed within the aperture, not visible, defined within the knife blade guard or cover bracket member 152 so as to again dispose the knife blade guard or cover member 148 at its locked position.

Thus, it may be seen that a new and improved a new and improved knife blade guard or cover locking mechanism, for use in conjunction with the sealing tape application rollers of a tape cartridge assembly of a carton or case sealing machine, has been provided wherein the knife blade guard or cover locking mechanism is adapted to be operatively connected to the slide block of the second spring biasing mechanism of the sealing tape application rollers such that when the sealing tape application rollers are effectively disposed at their inoperative positions, such as, for example, when the tape cartridge assembly is being loaded into or unloaded from the carton or case sealing machine, or when a sealing tape roll is being replaced or exchanged, the knife blade guard or cover locking mechanism is disposed at its locked position so as to effectively cover or enclose the knife blade or cutting member in order to protect operator or maintenance personnel from being accidentally or inadvertently cut. Conversely, when the sealing tape application rollers are effectively disposed at their operative positions, such as, for example, during a carton or case sealing operation, the knife blade guard or cover locking mechanism is effectively automatically unlocked so as to permit the knife blade or cutting member to in fact be uncovered or exposed and thereby perform its sealing tape cutting or severing operation. Upon conclusion of the sealing tape cutting or severing operation, the component parts return to their original or start positions whereby the knife blade or cutting member is again covered by means of the knife blade guard or cover.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A knife blade guard locking mechanism, comprising:

a knife blade, movably mounted between a first inoperative, non-cutting position, and a second operative cutting position for performing a cutting procedure during a cyclical operation;

a knife blade guard movable between a first position at which said knife blade guard covers said knife blade such that said knife blade cannot be used to perform the cutting procedure during a first portion of the cyclical operation, and a second position at which said knife blade guard uncovers said knife blade so as to permit said knife blade to be used to perform the cutting procedure during a second portion of the cyclical operation;

a locking device, engageable with said knife blade guard during the first portion of the cyclical operation, for preventing said knife blade guard from moving from said first position at which said knife blade guard covers said knife blade so as to prevent said knife blade from performing the cutting procedure, and disengageable from said knife blade guard during the second portion of the cyclical operation, for permitting said knife blade guard to move from said first position at which said knife blade guard covers said knife blade so as to prevent said knife blade from performing the cutting procedure during the first portion of the cyclical operation, to said second position at which said knife blade guard uncovers said knife blade so as to permit said knife blade to perform the cutting procedure during the second portion of the cyclical operation;

said knife blade guard comprises a bracket member having an aperture defined therein; and said locking device comprises a lug member which is adapted to be engaged within said aperture, defined within said bracket member of said knife blade guard, during the first portion of the cyclical operation so as to prevent said knife blade guard from moving from said first position at which said knife blade guard covers said knife blade so as to prevent said knife blade from performing the cutting procedure, and which is adapted to be disengaged from aperture, defined within said bracket member of said knife blade guard, during the second portion of the cyclical operation so as to permit said knife blade guard to move from said first position, at which said knife blade guard covers said knife blade so as to prevent said knife blade from performing the cutting procedure during the first portion of the cyclical operation, to said second position at which said knife blade guard uncovers said knife blade so as to permit said knife blade to perform the cutting procedure during the second portion of the cyclical operation.

2. The locking mechanism as set forth in claim 1, wherein:

said knife blade guard is pivotally movable between said first and second positions.

3. The locking mechanism as set forth in claim 2, further comprising:

a biasing spring for normally biasing said knife blade guard to its first position at which said knife blade guard covers said knife blade.

4. A knife blade guard locking mechanism, comprising:

a knife blade for performing a cutting procedure during a cyclical operation;

a knife blade support arm upon which said knife blade is fixedly supported, said knife blade support arm being movably mounted between a first position at which said knife blade is disposed at a first, inoperative non-cutting position, and a second position at which said knife blade is disposed at a second operative cutting position;

a knife blade guard movable between a first position at which said knife blade guard covers said knife blade such that said knife blade cannot be used to perform the cutting procedure during a first portion of the cyclical operation, and a second position at which said knife blade guard uncovers said knife blade so as to permit said knife blade to be used to perform the cutting procedure during a second portion of the cyclical operation;

a locking device, engageable with said knife blade guard during the first portion of the cyclical operation, for preventing said knife blade guard from moving from said first position at which said knife blade guard covers said knife blade so as to prevent said knife blade from performing the cutting procedure, and disengageable from said knife blade guard during the second portion of the cyclical operation, for permitting said knife blade guard to move from said first position at which said knife blade guard covers said knife blade so as to prevent said knife blade from performing the cutting procedure during the first portion of the cyclical operation, to said second position at which said knife blade guard uncovers said knife blade so as to permit said knife blade to perform the cutting procedure during the second portion of the cyclical operation;

said knife blade guard comprises a bracket member having an aperture defined therein; and said locking device comprises a lug member which is adapted to be engaged within said aperture, defined within said bracket member of said knife blade guard, during the first portion of the cyclical operation so as to prevent said knife blade guard from moving from said first position at which said knife blade guard covers said knife blade so as to prevent said knife blade from performing the cutting procedure, and which is adapted to be disengaged from aperture, defined within said bracket member of said knife blade guard, during the second portion of the cyclical operation so as to permit said knife blade guard to move from said first position, at which said knife blade guard covers said knife blade so as to prevent said knife blade from performing the cutting procedure during the first portion of the cyclical operation, to said second position at which said knife blade guard uncovers said knife blade so as to permit said knife blade to perform the cutting procedure during the second portion of the cyclical operation.

5. The locking mechanism as set forth in claim 4, wherein:

said knife blade guard is pivotally movable between said first and second positions.

6. The locking mechanism as set forth in claim 5, further comprising:

a biasing spring for normally biasing said knife blade guard to its first position at which said knife blade guard covers said knife blade.

7. A case sealing machine for sealing cases with tape, comprising:

a framework;

a pair of tape application rollers for applying tape to forward and rearward portions of a case to be sealed;

a linkage bar for operatively linking said pair of tape application rollers together such that said pair of tape application rollers are moved together between original inoperative start positions at which said pair of tape application rollers are not applying tape to the case to be sealed, and second operative positions at which said pair of application rollers are applying tape to the case to be sealed;

a knife blade, movably mounted between a first inoperative, non-cutting position, and a second operative cutting position for performing a tape cutting procedure during a case sealing cyclical operation;

a knife blade guard movable between a first position at which said knife blade guard covers said knife blade such that said knife blade cannot be used to perform the cutting procedure during a first portion of the cyclical operation, and a second position at which said knife blade guard uncovers said knife blade so as to permit said knife blade to be used to perform the cutting procedure during a second portion of the cyclical operation;

a locking device, operatively associated with said linkage bar and engageable with said knife blade guard during the first portion of the cyclical operation, for preventing said knife blade guard from moving from said first position at which said knife blade guard covers said knife blade so as to prevent said knife blade from performing the cutting procedure, and disengageable from said knife blade guard during the second portion of the cyclical operation, for permitting said knife blade guard to move from said first position at which said knife blade guard covers said knife blade so as to prevent said knife blade from performing the cutting procedure during the first portion of the cyclical operation, to said second position at which said knife blade guard uncovers said knife blade so as to permit said knife blade to perform the cutting procedure during the second portion of the cyclical operation;

said knife blade guard comprises a bracket member having an aperture defined therein; and said locking device comprises a lug member which is adapted to be engaged within said aperture, defined within said bracket member of said knife blade guard, during the first portion of the cyclical operation so as to prevent said knife blade guard from moving from said first position at which said knife blade guard covers said knife blade so as to prevent said knife blade from performing the cutting procedure, and which is adapted to be disengaged from aperture, defined within said bracket member of said knife blade guard, during the second portion of the cyclical operation so as to permit said knife blade guard to move from said first position, at which said knife blade guard covers said knife blade so as to prevent said knife blade from performing the cutting procedure during the first portion of the cyclical operation, to said second position at which said knife blade guard uncovers said knife blade so as to permit said knife blade to perform the cutting procedure during the second portion of the cyclical operation.

8. The machine as set forth in claim 7, wherein:

said knife blade guard is pivotally movable between said first and second positions.

9. The machine as set forth in claim 8, further comprising:

a biasing spring for normally biasing said knife blade guard to its first position at which said knife blade guard covers said knife blade.

10. The machine as set forth in claim 7, further comprising:

a slide block operatively connected to said linkage bar; and said lug member is mounted upon said slide block so as to be engaged within said aperture, defined within said bracket member of said knife blade guard, during the first portion of the cyclical operation, when said pair of tape application rollers are disposed at their original start inoperative positions so as to prevent said knife blade guard from moving from said first position at which said knife blade guard covers said knife blade so as to prevent said knife blade from performing the cutting procedure, and which is adapted to be disengaged from aperture, defined within said bracket member of said knife blade guard, during the second portion of the cyclical operation, when said pair of tape application rollers are disposed at their second operative positions so as to permit said knife blade guard to move from said first position, at which said knife blade guard covers said knife blade so as to prevent said knife blade from performing the cutting procedure during the first portion of the cyclical operation, to said second position at which said knife blade guard uncovers said knife blade so as to permit said knife blade to perform the cutting procedure during the second portion of the cyclical operation.

11. The machine as set forth in claim 7, wherein:

said knife blade and said knife blade guard are mounted upon a knife support arm.

12. The machines as set forth in claim 11, wherein:

said knife support arm is pivotally mounted upon said framework.

13. The machine as set forth in claim 12, wherein:

said knife support arm is normally biased in a vertically downward direction so as to normally dispose said knife blade at its cutting position.

* * * * *